United States Patent [19]
Ady

[11] 3,945,534
[45] Mar. 23, 1976

[54] FOOD PREPARATION AND DISPENSING SYSTEM

[75] Inventor: Esthmel W. Ady, Othello, Wash.

[73] Assignee: Baker & Ady, Inc., Kennewick, Wash.

[22] Filed: Dec. 20, 1972

[21] Appl. No.: 316,686

[52] U.S. Cl. .............. 222/105; 222/131; 426/412; 426/523; 222/146 HS; 222/195; 222/400.7
[51] Int. Cl.² ................. B65D 35/56; A23L 1/00
[58] Field of Search ........ 222/131, 183, 195, 400.7, 222/146 HS, 105; 426/412, 520, 523

[56] References Cited
UNITED STATES PATENTS

| | | | |
|---|---|---|---|
| 213,029 | 3/1879 | Ashcroft | 426/523 |
| 1,230,052 | 6/1917 | Stevenson | 222/95 |
| 2,380,134 | 7/1945 | Waters | 426/412 |
| 2,549,207 | 4/1951 | Kestenbaum | 222/131 |
| 2,905,560 | 9/1959 | Bender et al. | 222/183 X |
| 2,930,423 | 3/1960 | Cunningham | 222/95 X |
| 3,349,965 | 10/1967 | Krugger | 222/400.7 |
| 3,371,822 | 3/1968 | Galloway | 222/95 |
| 3,590,888 | 7/1971 | Coleman | 222/95 X |

FOREIGN PATENTS OR APPLICATIONS

| | | | |
|---|---|---|---|
| 570,451 | 8/1958 | Belgium | 222/95 |

Primary Examiner—Robert B. Reeves
Assistant Examiner—Frederick R. Handren
Attorney, Agent, or Firm—Clarence A. O'Brien; Harvey B. Jacobson

[57] ABSTRACT

Food preparation, or processing and dispensing apparatus having an outer housing provided with an opening in a one wall, and an inner housing arranged in the first housing with a projecting portion arranged extending through the outer housing opening and in sealed relationship with the opening. Each housing has an access opening sealable simultaneously by connected-together covers. A food package is arrangeable in the inner housing. This food package has a neck threadable through the projecting portion, and a flexible bag attached to the neck. A collar mounted on the end of the neck engages an end surface of a valve assembly connected to the projecting portion of the inner housing to lock the package in the device. The valve assembly may pinch the neck and close it off, or release the neck and permit it to open. Either a pipe associated with the collar or a venting tube, or both, may be used to increase the pressure inside the bag and force the contents of the package out through the neck when same is open. If the pipe is used, an advantageous sparging action is obtained.

8 Claims, 6 Drawing Figures

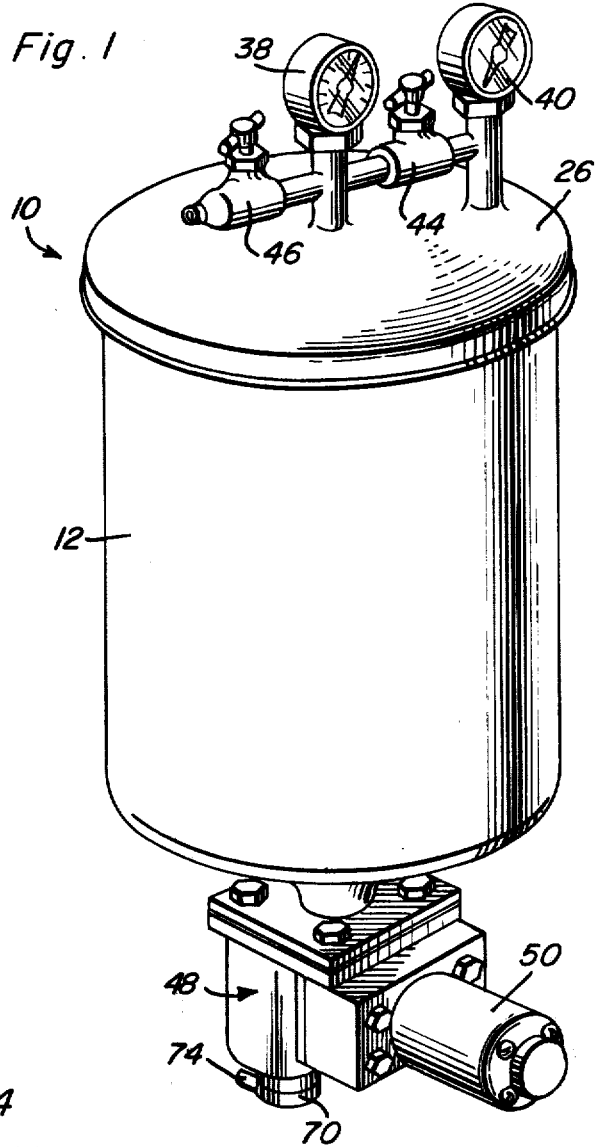
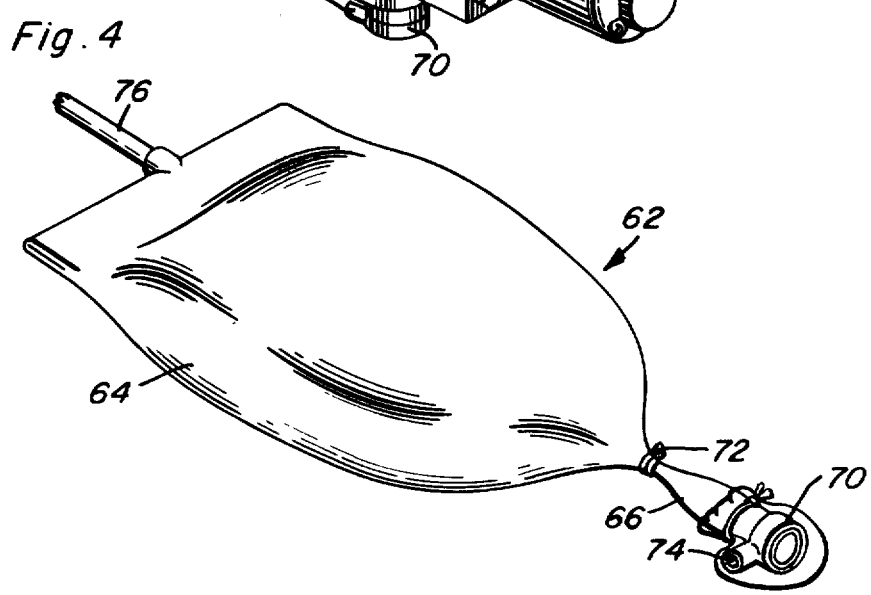

FOOD PREPARATION AND DISPENSING SYSTEM

BACKGROUND OF THE INVENTION

1. Field of the Invention

This invention relates to apparatus for packaging, processing, and dispensing food.

2. Description of the Prior Art

The retail and wholesale food industries have undergone rapid change in the past decade. Among these changes has been rapid development in the food packaging materials field, notably the increased use of plastic packaging. Examples of such packaging include boiling bags and shrink wrap. These new packaging developments, together with the continual quest for new consumer products, have rapidly expanded the array of products available to the consumer. They are the core of today's self-service economy.

In general, the new products among the new packaging and material development share common characteristics. The products in question tend to be pre-prepared, and are usually promoted as convenience foods. Concurrent with a more exotic or segmented market appeal, these products place great emphasis on product promotion, brand identification, and readily understandable advertising to stimulate sales.

Although new packaging materials are considered useful in terms of convenience to the retail buyer, the institutional buyer has not experienced the availability of similar developments. The food of institutional food users, such as restaurants, hospitals, and schools, still must be conventionally prepared and dispensed. Further, incident to this preparation and dispensing are associated problems of quality control, consistant qualified help, and sanitation.

The American economic scene is shifting towards increased employment of women, smaller families, and more available institutional services for a more varied diet. Each of these changes generally tends to reduce the amount of at-home cooking, while increasing the demand for convenience products.

SUMMARY OF THE INVENTION

It is an object of the present invention to provide a food processing and dispensing apparatus particularly suited for institutional use.

It is another object of the present invention to provide a food processing and dispensing apparatus for use with packaged foods.

It is yet another object of the present invention to provide a food package for use with food processing and dispensing apparatus according to the present invention.

These and other objects are achieved according to the present invention by providing apparatus having: a first housing provided with an opening in a wall; and a second housing removably arranged in the first housing and having a projecting portion arranged for extending through the first housing opening.

A cover may be arranged for sealing another opening of the first housing and permitting the first housing to be a pressure vessel, and a further cover arranged for sealing an opening of the second housing adjacent the other, or cover sealing opening of the first housing. Advantageously, these covers are connected together so placement of one in an opening sealing position assures placement of the other in a similar position.

A valve assembly is preferably connected to the projecting portion of the inner housing, and arranged for selectively opening and closing the neck of a food package arranged in the apparatus.

A preferred food package for use with apparatus according to the present invention has a bag arrangeable in the second, or inner housing. This bag is provided with a constricted portion forming a neck terminating in an opening and arrangeable threaded through the projecting portion and valve. Advantageously, the bag neck is provided with a collar mounted adjacent the opening of the neck for engaging an end surface of the valve and locking the food package in the second housing and valve.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 of the drawings is a perspective view showing a food processing and dispensing apparatus according to the present invention.

FIG. 4 is a fragmentary, perspective view showing a food package according to the present invention.

DESCRIPTION OF THE PREFERRED EMBODIMENTS

Figure 2:
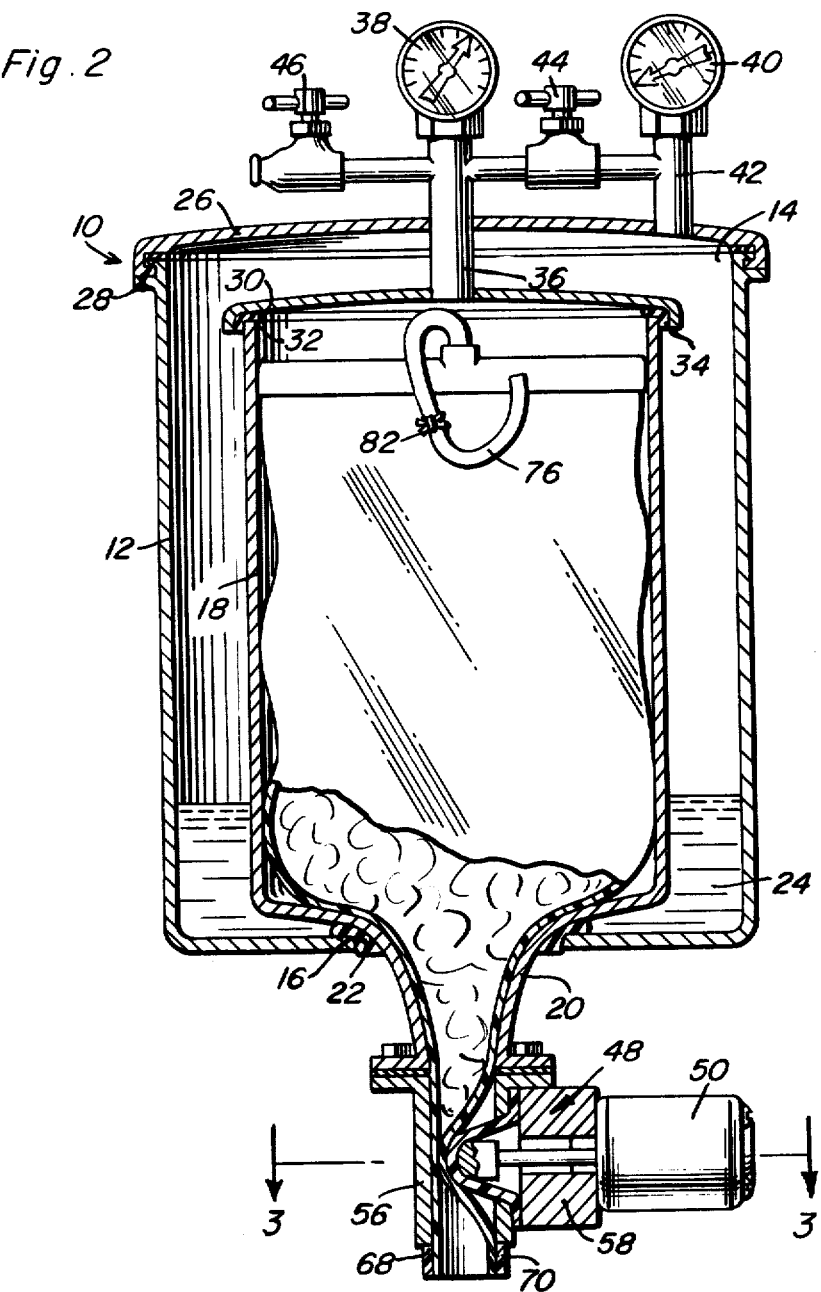
FIG. 2 is a vertical sectional view, with some parts not in section, showing the apparatus of FIG. 1.
Figure 3:
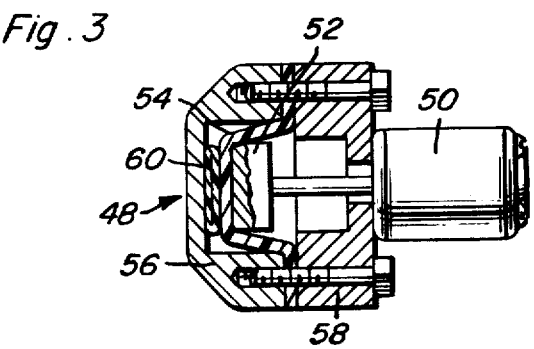
FIG. 3 is a sectional view, with some parts not in section, taken generally along the line 3—3 of FIG. 2.

FIGS. 1 to 3 show an apparatus 10 according to the present invention having a first, or outer housing 12 provided with openings 14 and 16, and a second, or inner housing 18 arrangeable in housing 12 and having a constricted, projecting portion 20 arranged for extending through opening 16. A seal 22, constructed from a suitable, known material, permits projecting portion 20 to extend through opening 16 in sealed relation with respect thereto. In this manner, housing 12 forms a container for a fluid which, for example, heats the contents of housing 18, which itself forms a restraining container. The processing fluid is designated 24 in FIG. 2 of the drawings. Projecting portion 20 is shaped such that it forms a neck arranged for receiving a neck of a food package to be set out below.

A cover 26 is shown arranged on housing 12 for sealing, with the aid of a gasket 28, opening 14 and permitting housing 12 to function as a pressure vessel, while a cover 30 is arranged covering an opening 32 of housing 18 for sealing, with the aid of a gasket 34, opening 32. As can be readily appreciated from the drawings, opening 32 is adjacent opening 14 so that a food package may be readily inserted into housing 18. Advantageously, covers 26 and 30 are connected together as by a post 36 so placement of one cover 26, 30 in an opening sealing position ensures placement of the other cover 30, 26 in a similar position. Post 36 may be provided with a bore (not shown) permitting communication with the interior of housing 18 from outside of housing 12. Conventional gauges 38 and 40 are provided for measuring the pressure within housings 18 and 14, respectively; the latter being placed in communication with the interior of housing 12 as by a hollow post 42. Valves 44 and 46 are provided to permit the selective release of pressure from within the housings 12 and 18.

A valve assembly 48 is connected to the flanged end of portion 20, and is arranged for selectively opening and closing the neck of a food package. This valve assembly 48 has a, for example, electrical or pneumatic actuator 50 (FIG. 3) which is advantageously of a known type permitting proportional control of food dispensed by apparatus 10. The illustrated embodiment has a piston 52 acting on a diaphragm 54 which pinches the food package neck to closeoff same. Valve housing portions 56 and 58 are selectively connected together to form the valve housing of valve assembly 48. A piece of, for example, suitable, known resilient material is mounted in a known manner in portion 56 to form a seat for diaphragm 54 and piston 52.

Referring now to FIG. 4 of the drawings, a food package 62 according to the present invention has a bag 64 constructed in a conventional manner from a suitable, known flexible material. Bag 64 has a constricted portion forming a neck 66 terminating in an opening 68. This neck 66 is arrangeable in projecting portion 20 and valve assembly 48, as can best be seen in FIG. 2 of the drawings. Once neck 66 is threaded through valve assembly 48, a collar 70 mounted on the neck adjacent opening 68 will engage the end of the valve housing adjacent opening 68 and lock the food package 62 in housing 18 and valve assembly 48. Collar 70 may be threaded through the valve housing by designing the latter to have a larger dimension in one direction than the other, as can best be seen in FIG. 3 of the drawings, so that collar 70 may be arranged to pass through the opening of the valve housing in a plane parallel to collar 70, and then after passing through the valve housing be arranged in a plane perpendicular to the passage for locking the package 62 in position.

Tie 72 is used to close off neck 66 while bag 64 is being filled. Filling advantageously takes place by leaving open the side of bag 64 opposite tie 72, and then sealing this side in a conventional manner once bag 64 is filled with a suitable food.

A fitting 74 may be provided on collar 70 for a purpose to be set out below. In addition, a tube 76 is advantageously attached to bag 64 and arranged for selectively venting package 62 during, for example, cooking of a food in the bag.

Figure 5:
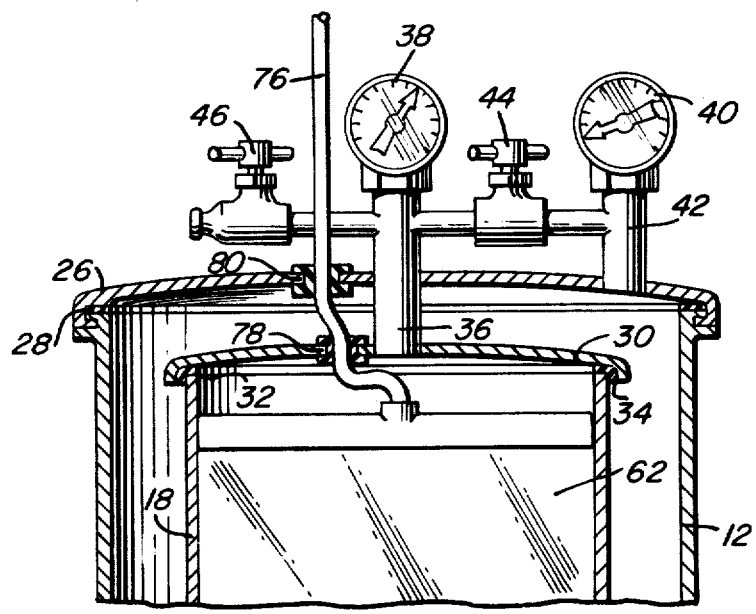
FIG. 5 is a fragmentary, vertical sectional view, with some parts not in section, showing an advantageous feature according to the present invention.

FIG. 5 of the drawings shows how tube 76 may be passed through openings 78 and 80 provided in covers 36, 26, respectively, for venting a food in a package 62. Grommet-like seals may be used in openings 78 and 80. When it is not desired to vent a package 62, tube 76 may be closed off as by a tie 82 (FIG. 2), while suitable plugs (not shown) may be inserted in openings 78 and 80.

Figure 6:
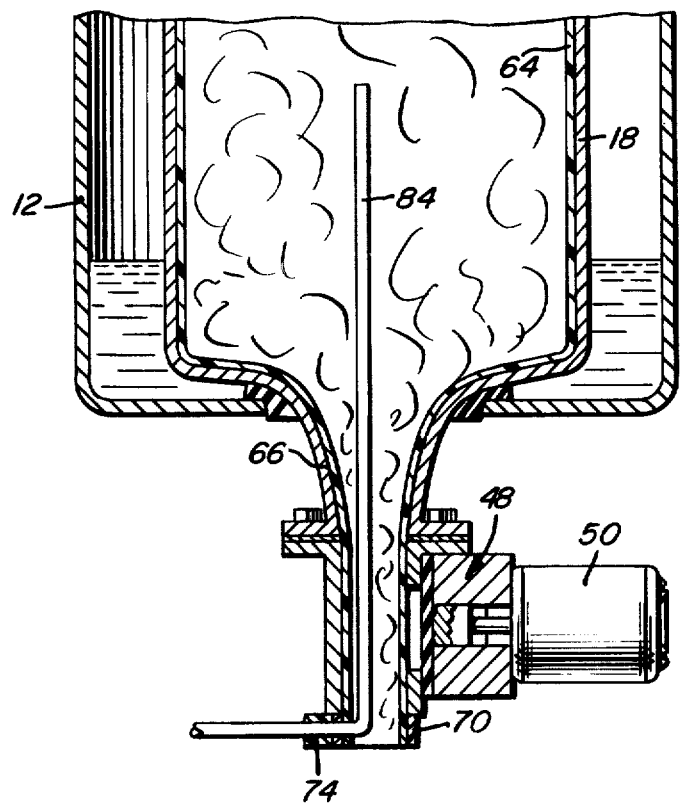
FIG. 6 is a fragmentary, vertical sectional view, with some parts not in section, showing another advantageous feature according to the present invention.

FIG. 6 of the drawings shows a line 84 arranged passing through fitting 74 and into bag 64. This line may be used to inject a fluid, such as air, into the bag and forcing a food contained in the bag out of opening 68. Alternatively, or in combination, tube 76 may be used to inject the pressure increasing fluid. Line 84 has the advantage of sparging the food in package 62 and stirring same.

In those instances when tube 76 is arranged as shown in FIG. 5 for venting the contents of the package 62, tube 76 may be closed off as by a tie 82 to permit the pressure increase in bag 64.

A food processing and dispensing apparatus 10 according to the present invention comprises an integrated system which brings food, which may be initially frozen or chilled, from a cold or ambient temperature up to, for example, 250° F., and then reduces the temperature down to and holds the food at 180° F., for example. The food can then be dispensed in controlled portions through valve assembly 48. Food package 62 may be constructed from a heavy-duty plastic or polymeric film. The special configuration of package 62 and the use of film in its construction results in increased sanitation levels, uniform bulk handling, little or no clean-up, and the elimination of such expensive materials as stainless steels normally required for handling foods and the like.

A package 62 according to the present invention has several functions. First, the package is a container for a food product which has previously been packaged in a, for example, processing plant. In this instance, the material must be durable, have good resistance to cracking even when frozen, and must be relatively inexpensive. Second, the packaging material must have good heat transfer properties, and must be able to withstand, for example, 250° F. temperatures for short periods of time and, for example 180° F. temperatures for extended time periods.

In addition to its function as a food container, protector, and heating vessel, package 62 must have structural features such as those set out above in order to be properly matched with the processing and dispensing apparatus 10.

In order to use apparatus 10, the dual covers 26, 30 are first removed and valve assembly 48 is actuated to its open position (FIG. 6). It is to be understood that in place of a common diaphragm valve as illustrated, a peristaltic or finger valve could also be used where the actuated valve would close like a "V" collapsing. An electrically actuated valve coupled with an electrically actuated pressure valve interconnecting housings 12 and 18 could also be employed. An electrical impulse would initiate opening. Simultaneously, the pressure valve connecting the housing would be opened, pressurizing bag 64 and housing 18. This increased pressure assists gravity in forcing the food contents into a proper receptacle. Use of electronically actuated valving is the basis for a completely automated apparatus 10. An electronic counter, and the like, could be incorporated to record the number of servings and indicate when package 62 must be replaced.

Once covers 26, 30 are removed and valve assembly 48 is opened, a food package 62 may be removed from its, for example, carboard container (not shown) in a, for example, frozen or chilled state. Tie 72, if still on package 62, would now be removed. Neck 66 of bag 64 would be threaded through projecting portion 20 and valve assembly 48 and clamped into position by proper orientation of collar 70. A sanitary paper cap or seal (not shown) covering opening 68 would be removed. Collar 70 is preferably constructed from a rigid material to facilitate the performance of its locking function. Tube 76 and line 84 would be connected as desired, and covers 26, 30 locked into place. Valve assembly 48 may not be moved to its closed position, as shown in FIG. 2.

Steam, and the like, would now be injected into apparatus 10 in a suitable, known manner (not shown). It is to be understood that other suitable heating mediums, such as hot oil or grease, may be used in place of steam. As the contents of package 62 melt, neck 66 will fill with the food material. After initially heating the apparatus 10 to a predetermined temperature, the temperature may be dropped to another predetermined temperature and maintained at that temperature for a predetermined period of time. After this predetermined period of time has expired, valve assembly 48 may be opened in a suitable manner, such as by electrical actuation, and the pressure of bag 64 increased by passing a fluid medium from a conventional source (not shown) of that pressurized medium by means of tube 76, line 84, or both. Sparging may be used if applicable.

After package 62 is emptied, the heating fluid may be drained or vented either to the atmosphere or to a central heat reservoir (not shown); a plug (not shown) may be used to reclose neck 66; and covers 26, 30 may be removed to permit removal of the empty package 62.

Regarding the use of the line 84 to sparge the food, such sparging may be completely inappropriate for such foods as mashed potatoes. In these cases, only tube 76, which may be considered an umbilical cord, need be used. On the other hand, if the food is a sauce, gravy, soup, or light stew, the stirring action created by the sparging could be beneficial. Line 84 should be constructed from a flexible material which will be closed by the action of valve assembly 48.

The material selected for package 62 must be such as to permit mass production, low cost, durability, the ability to withstand prolonged exposure to heat and cold, and acceptable to the Food and Drug Administration. Such materials as high density polyethylene, polyester-polyethylene composites, and polyester films have been found satisfactory. Polyethylene may also be used for the rigid parts such as collar 70. Properties which must be considered in selecting a material include: moisture change; oxygen gain; rancidity level; carbon dioxide change; flavor changes; color changes; factor affecting staling of the product; and storage time.

Since the food does not come in contact with apparatus 10 at any time during the processing and dispensing thereof, materials such as aluminum, high temperature withstanding synthetics, and miscellaneous carbon steels may be used to construct housings 12 and 18. The basic requirements for material selection for housings 12 and 18, are that housing 12, the heating container, must be able to withstand heat and pressure, and that housing 18, the restraining container, must be able to withstand heat and provide structural support to package 62 and its contents. Housing 18 also serves as a cylinder when pressure is applied to force the food contents from package 18 and through valve assembly 48 and into a food receptacle (not shown).

Alternatively to packaging food in packages 62, containers in size from one to five gallons, depending on the situation, could be used, and the food could be put directly into housing 18.

Although the exact manner of admitting the heating medium into housing 12 is not shown in the drawings, it is to be understood that it could be simply a port in a wall of housing 12. Further, a conventional drain (not shown) could be arranged in the bottom of housing 12 adjacent its opening 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for processing and dispensing food, comprising, in combination:
    a. a first housing provided with a cavity, an opening, and a further opening, both openings communicating with the cavity, the opening being disposed in a wall of the first housing;
    b. a cover pressure withstandingly connected to the first housing and arranged for sealing the further opening thereof and permitting the first housing to be a pressure vessel;
    c. a second housing arranged in the first housing and having a further cavity, an open side, and a hollow projecting portion, the latter being arranged extending through the first housing opening, with the open side and projecting portion communicating with the further cavity;
    d. a further cover arranged on the second housing for sealing the open side thereof, the open side being disposed adjacent the first housing further opening;
    e. passage means connected to the further cover and passing through the cover for permitting communication with the further cavity from outside the first housing;
    f. a food package including a bag removably arranged in the second housing and provided with a constricted portion forming a neck terminating in an outlet opening, the bag neck arranged in the projecting portion of the second housing; and
    g. a valve assembly connected to the projecting portion and arranged for selectively opening and closing the bag neck.

2. A structure as defined in claim 1, wherein the further cover is connected to the cover so placement of one in an opening sealing position assures placement of the other in an opening sealing position.

3. A structure as defined in claim 1, wherein the bag neck is threaded through the valve, and means is mounted on the bag neck adjacent the opening for locking the food package in the second housing and valve.

4. A structure as defined in claim 1, wherein the projecting portion is constricted and forms a further neck arranged for receiving a neck of the food package contained in the second housing.

5. A structure as defined in claim 1, wherein the projecting portion extends through the opening of the first housing in sealed relation with respect thereto, and the first housing forms a container for a fluid which processes contents of the second housing, the second housing forming a restraining container.

6. A structure as defined in claim 1, further including means for selectively injecting a fluid into the bag and forcing a substance contained in the bag out of the outlet opening of the bag neck.

7. A structure as defined in claim 6, wherein the injecting means is a fluid line connected to the locking means for additionally sparging the contents of the bag.

8. A method for heating and dispensing food, comprising the steps of:

a. placing food to be cooked in a bag and arranging the bag in a restraining container;
b. arranging the restraining container within a heating container;
c. controlling pressure within the restraining container and heating container;
d. supplying a heating medium under pressure into the heating container for indirectly heating the food bag for cooking the food in the bag;
e. selectively venting the bag during cooking of the food;
f. opening an outlet to the heated food bag and through the restraining container and the heating container; and
g. increasing the pressure inside the bag to force the food out of the bag through the opened outlet.

* * * * *